(12) United States Patent
Kwok et al.

(10) Patent No.: US 7,697,760 B2
(45) Date of Patent: Apr. 13, 2010

(54) HANDWRITTEN WORD RECOGNITION USING NEAREST NEIGHBOR TECHNIQUES THAT ALLOW ADAPTIVE LEARNING

(75) Inventors: Thomas Yu-Kiu Kwok, Washington Township, NJ (US); Michael Peter Perrone, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/972,913

(22) Filed: Jan. 11, 2008

(65) Prior Publication Data

US 2008/0107340 A1 May 8, 2008

Related U.S. Application Data

(63) Continuation of application No. 10/079,763, filed on Feb. 19, 2002, now Pat. No. 7,343,041.

(60) Provisional application No. 60/271,012, filed on Feb. 22, 2001.

(51) Int. Cl.
*G06K 9/00* (2006.01)
*G06K 9/18* (2006.01)
*G06K 9/72* (2006.01)

(52) U.S. Cl. .................. 382/186; 382/187; 382/229

(58) Field of Classification Search ......... 382/182–189, 382/229–231
See application file for complete search history.

(56) References Cited

U.S. PATENT DOCUMENTS 3,979,722 A 9/1976 Sakoe
5,075,896 A 12/1991 Wilcox et al.
3,191,721 A 6/1994 Chefalas et al.
5,680,480 A * 10/1997 Beernink et al. ............ 382/187
6,028,959 A * 2/2000 Wang et al. ................. 382/185
6,061,472 A 5/2000 Hullender et al.
6,859,556 B2 * 2/2005 Takebe et al. ............... 382/218
6,950,555 B2 * 9/2005 Filatov et al. ............... 382/229
7,496,547 B2 * 2/2009 Abdulkader et al. .......... 706/20
2002/0114523 A1 * 8/2002 Filatov et al. ............... 382/229
2005/0074169 A1 * 4/2005 Filatov et al. ............... 382/229
2006/0274943 A1 * 12/2006 Abdulkader et al. ........ 382/186

OTHER PUBLICATIONS

Plessis et al., "A Multi-Classifier Combination Strategy for the Recognition of Handwritten Cursive Words", Oct. 1993, Proceeding of the Second International Conference on Document Anaysis 1993, pp. 642-645.*

* cited by examiner

*Primary Examiner*—Aaron W Carter
(74) *Attorney, Agent, or Firm*—Ryan, Mason & Lewis, LLP

(57) ABSTRACT

A handwritten word is transcribed into a list of possibly correct transcriptions of the handwritten word. The list contains a number of text words, and this list is compared with previously stored set of lists of text words. Based on a metric, one or more nearest neighbor lists are selected from the set. A decision is made, according to a number of combination rules, as to which text word in the nearest neighbor lists or the recently transcribed list is the best transcription of the handwritten word. This best transcription is selected as the appropriate text word transcription of the handwritten word. The selected word is compared to a true transcription of the selected word Machine learning techniques are used when the selected and true transcriptions differ. The machine learning techniques create or update rules that are used to determine which text word of the nearest neighbor lists or the recently transcribed list is the correct transcription of the handwritten word.

12 Claims, 4 Drawing Sheets

|   |   |   |
|---|---|---|
| | if $((W_1 = R_1)$ or $(W_1 = R_2)$ or $(W_1 > S_U))$ | return $W_1$ |
| else | if $((W_2 > S_M)$ and $((W_2 = R_1)$ or $(W_2 = R_2)))$ | return $W_2$ |
| else | if $(R_1 > f_U)$ | return $R_1$ |
| else | if $((W_1 > S_M)$ and $(W_1 > L_d))$ | return $W_1$ |
| else | if $((R_1 > f_M)$ and $(R_1 < L_d))$ | return $R_1$ |
| else | if $(W_1 > S_M)$ | return $W_1$ |
| else | if $(R_1 > f_M)$ | return $R_1$ |
| else | if $((W_1 > S_L)$ and $(W_1 > L_d))$ | return $W_1$ |
| else | if $((R_1 > f_L)$ and $(R_1 < L_d))$ | return $R_1$ |
| else | if $(W_1 > S_L)$ | return $W_1$ |
| else | if $(R_1 > f_L)$ | return $R_1$ |
| else | | return $W_1$ |

FIG. 2

HANDWRITTEN WORD RECOGNITION USING NEAREST NEIGHBOR TECHNIQUES THAT ALLOW ADAPTIVE LEARNING

CROSS REFERENCE TO RELATED APPLICATIONS

This application is a Continuation application of U.S. patent application Ser. 10/079,763, now U.S. Pat. No. 7,343,041, filed Feb. 19, 2002 which claims the benefit of U.S. Provisional Application No. 60/271,012, filed Feb. 22, 2001.

FIELD OF THE INVENTION

The present invention relates to machine handwriting recognition and, more particularly, relates to handwritten word recognition using nearest neighbor techniques that allow adaptive learning

BACKGROUND OF THE INVENTION

Despite extensive research in handwriting recognition, satisfactory recognition accuracy still remains elusive. This is particularly true for unconstrained handwriting. Unconstrained handwriting occurs, for example, in handwritten recognition systems that are used to transcribe notes. For this type of unconstrained handwriting, handwriting recognition applications have to deal with users who are free to use any combination of printing and cursive writing. Additionally, people taking notes often write hurriedly, often write at a slant, and may not complete certain characters that should be completed. Thus, unconstrained handwriting recognition is quite hard Another reason for the lack of satisfactory recognition accuracy is the tremendous variability that exists between writing styles of individuals. Since one cannot know in advance the style of writing that an individual may have, one must either attempt to make a "universal" recognizer that can recognize any writing style, or make a system that can adapt to the particular style of a writer. Both systems exist and each has its own benefits and detriments. For example, universal recognizers tend to work better in locations where a large number of people use the recognition system, while adaptive recognizers tend to work well when only a single per son uses the recognition system.

A detriment to both of these systems is that they are initially designed to perform a fixed set of functions. For instance, if a vendor has a particular recognizer, it is generally impractical or impossible to add any type of adaptive functionality to the recognizer. Moreover, if a system is adaptive, there is generally no way to use a different recognition engine with the system. Finally, adaptive learning techniques still deal with inherent imperfections in a handwritten recognizer. There are few techniques that help to correct errors caused by the statistical structure of handwriting recognizers. For example, if a person consistently writes the word "cat," a handwriting recognizer might consistently transcribe this handwritten word into "cut." This is accurate in a statistical sense, as the handwriting recognizer is always outputting the same word, but is an inaccurate transcription of the handwritten word. There are relatively few systems that can collect this error.

There is, therefore, a need for techniques that allow adaptive learning for currently existing handwriting recognition systems and that use the statistical structure of handwriting recognizers to correct transcription errors.

SUMMARY OF THE INVENTION

The present invention provides techniques for using multiple transcriptions of words to correct errors caused by handwriting recognition. Additionally, the present invention can be adaptive, so that a handwriting recognition system using the present invention will, over time, generate fewer recognition errors.

In one aspect of the invention, a handwritten word is transcribed into a list of possibly collect transcriptions of the handwritten word. The list contains a number of text words, and this list is compared with a previously stored set of lists of text words. Based on a metric, one or more nearest neighbor lists are selected from the set. A decision is made, according to a number of combination rules, as to which text word in the nearest neighbor lists or the recently transcribed list is the best transcription of the handwritten word. This best transcription is selected as the text word transcription that is output by the system.

In a second aspect of the invention, the best transcription of a handwritten word is compared to a true transcription of the handwritten word. Machine learning techniques are used when the best transcription and true transcriptions differ. The machine learning techniques create or update combination rules that are used to determine which text word of the nearest neighbor lists or the recently transcribed list is the correct transcription of the handwritten word. During learning, the list, from the nearest neighbor lists or the recently transcribed list, with the correct transcription of the handwritten word may be stored in the previously stored set of words.

A more complete understanding of the present invention, as well as further features and advantages of the present invention, will be obtained by reference to the following detailed description and drawings.

BRIEF DESCRIPTION OF THE DRAWINGS

FIG. 2 is one possible structure (a decision tree, in this example) for deciding which text word, of a recognized word list and two nearest neighbor word lists, to select as the best selection for a handwritten word, in accordance with one embodiment of the present invention;

DETAILED DESCRIPTION OF PREFERRED EMBODIMENTS

Figure 1:
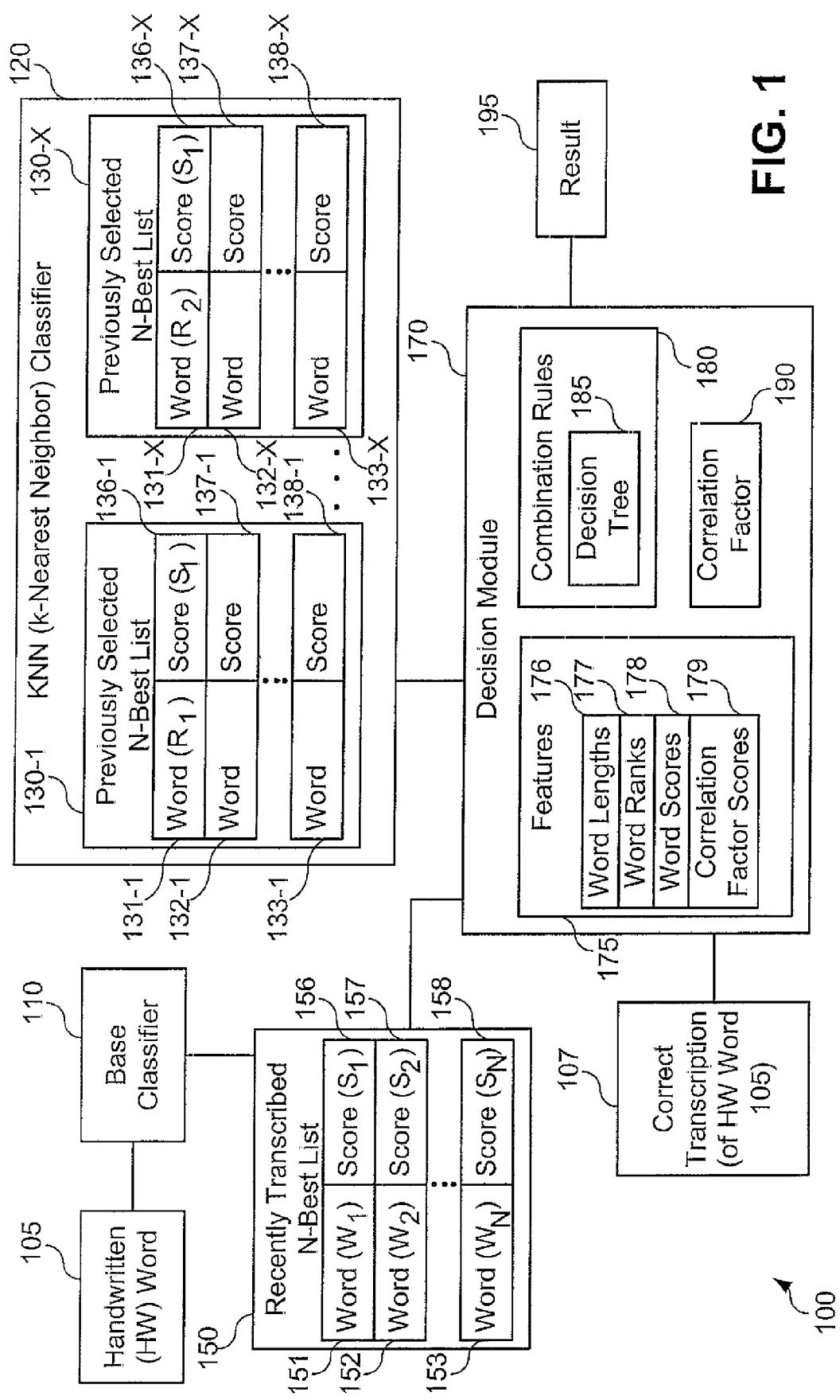
FIG. 1 is a block diagram of a system for handwritten word recognition using nearest neighbor techniques that allow adaptive learning, in accordance with one embodiment of the present invention.

Conventional techniques for handwriting recognition have used machine learning techniques such as hidden Markov models (HMMs) and neural networks (NNs). Conventional techniques for handwriting recognition have also used k-nearest neighbor (KNNs) algorithms. However, the present invention embodies a novel synthesis of these two approaches that leverages some of their strengths while avoiding some of their weaknesses. In particular, although KNN algorithms can be designed to quickly adapt to new data, due to the complexity of accurate handwriting recognition, the KNN handwriting recognition process is too slow and memory intensive for modern computers to be useful on its own. On the other hand, although the modest speed and memory usage of HMMs and NNs make their use feasible for handwriting recognition, HMMs and NNs are generally difficult and/or slow to train efficiently to adapt to new data.

By combining these methods, the present invention provides techniques for handwriting recognition that are fast, memory efficient and can easily adapt to new data. Another novel aspect of the present invention is the way in which machine learning algorithms use a lexically-defined space to dynamically select a space in which the KNN algorithm calculates the distances between neighbors.

This latter sentence is explained as follows. Any KNN algorithm has to calculate a distance between instances of data. There are two basic methods for doing this. One method is to take the raw data and define a distance. For example, a pixel by pixel "over lap" distance may be determined or an XY distance between the points of the ink "trajectory" as a function of time may be determined. In either of these examples, a large portion of the time is spent in calculating the optimal alignment. For instance, in the case of a pixel by pixel match, imagine having two transparent photographs of the same thing that are placed one on top of the other and attempted to be matched. The same thing can be done with the handwritten ink (the "images").

The second method is to extract features from the data and try to find a match between them. Since the first method is generally too slow, the second method is used. In terms of the present invention, the "features" extracted are the estimated likelihoods of a match with each word in a HMM's lexicon (i.e., word list) Since an example lexicon is 30,000 words (and in general can be much larger), this leads to a 30,000 dimensional KNN space. KNN methods do not work well in such large spaces. Consequently, aspects of the present invention define a metric that changes with each instance of a word (i.e., the metric preferably only focuses on the words that make it into the list of the top approximately 20 likelihoods of a KNN vector). This dynamic metric allows aspects of the present invention to take advantage of the efficiency of KNN without suffering from the speed and size problems of a KNN in a high dimensional space. Thus, aspects of the present invention take the entire lexical space and dynamically select a much smaller space in which a KNN algorithm calculates the distances between neighbors. As is known in the art, a lexicon is list of all words known to a handwriting recognition system.

Referring now to FIG. 1, a handwriting recognition system 100 is shown for handwritten word recognition using KNN techniques that allow adaptive learning, in accordance with one embodiment of the present invention System 100 comprises a base classifier 110, a recently transcribed N-best list 150, a KNN classifier 120, and a decision module 170. As is known in the art, an N-best list is basically a list of words, usually selected from a lexicon. This list of words may be determined from a classifier, such as base classifier 110, and generally has scores associated with each word. Usually, the N-best list is sorted by score. Recently transcribed N-best list 150 comprises a number of text words 151, 152, and 153, and a number of scores, 156, 157, and 158, one score per text word. KNN classifier 120 comprises X previously selected N-best lists, of which previously selected N-best lists 130-1 and 130-X are shown. Previously selected N-best lists 130 comprise a number of text words 131, 132, and 133 and a number of scores 136, 137, and 138, one score pet text word Decision module 170 comprises features 175, combination rules 180, and a correlation factor 190 features 175 comprise word lengths 176, word ranks 177, word scores 178, and correlation factor scores 179. In one embodiment, features 176, 177, 178, and 179 are used. However, these features 175 are merely representative of additional information used by the methods discussed below, and additional, less or different features may be used. Combination rules 180 comprises, in this example, a decision tree 185.

Basically, system 100 operates as follows. Base classifier 110 is used to transcribe handwritten word 105 into a recently transcribed N-best list 150. Base classifier 110 is usually part of a handwriting recognition engine. N-best list 150 has a number of text words 151, 152, and 153 and a number of scores 156, 157, and 158. Each text word 151 through 153 is a possible transcription of the handwritten word 105 and has a corresponding score. The score is a measure of the likelihood, according to the base classifier 110, that the text word is the correct transcription of the handwritten word 105. Base classifier 110 can comprise machine learning algorithms and techniques such as HMMs or NNs. Because of this, there could be different likelihoods depending on the machine learning algorithm that is employed or there could be several different words each having the same likelihood.

The decision module 170 compares the recently transcribed N-best list 150 with a number of N-best lists 130 stored in KNN classifier 120. The decision module 170 determines the KNNs to the recently transcribed N-best list 150. This means that there are k previously selected N-best lists from the KNN classifier 120 that are chosen as "resembling," in a mathematical way, the recently transcribed N-best list 150. The KNNs are determined by using correlation factor 190. The decision module 170 then uses features 175 of N-best list 150 and the KNNs to determine the text word from these N-best lists that is the best word choice. The combination rules 180 essentially use the features 175 to select a text word as the best choice from among the text words offered by the N-best list 150 and its KNNs. The result 195 is the text word selected by decision module 170. Optionally, result 195 could comprise an N-best list, such as N-best list 150.

Additionally, handwriting recognition system 100 may also adapt over time. To provide this functionality, the correct transcription 107 of handwritten word 105 is used Correct transcription 107 is compared to text words in N-best lists 150 and 130. There are several scenarios that can occur. Assume that the correct transcription 107 is not found in any of the text words of the lists 150 and 130. It is unlikely that system 100 (or any system) can correct such an error. If the correct transcription 107 is found in one of the lists 150 and 130, but not the list selected by the decision module 170, the combination rules 180 are modified to select the list containing the correct transcription 107. If the recently transcribed N-best list 150 is the list containing the correct transcription 107, the recently transcribed N-best list 150 is added to the KNN classifier 120. It is also possible the recently transcribed N-best list 150 will contain the correct transcription 107 and also will match one of the previously selected N-best lists 130 In this case, the recently transcribed N-best list 150 is not added to the KNN classifier 120. Thus, the system 100 supports learning and can adapt to new words not in KNN classifier 120

The previous explanation is only a basic description of the system 100, and should not be construed to be limiting. A more detailed description follows The base classifier 110 can be any model capable of generating an N-best list. For example, a hidden Markov model (HMM) may be used as base classifier 110. This type of base classifier is described in more detail in Subrahmonia et al., "Writer Dependent Recognition of On-Line Unconstrained Handwriting," IEEE Int'l Conf. On Acoustics, Speech And Signal Proc., 3478-3481 (1996), the disclosure of which is incorporated herein by reference.

The recently transcribed N-best list 150 is sent to a decision module 170, which decides whether to use the N-best list from the base classifier 110 or to use an alternate N-best list selected using a KNN classifier 120. KNN classifier 120 is, as discussed above, preferably a KNN classifier; as discussed in Duda et al., "Pattern Classification and Scene Analysis," John Wiley & Sons (1973), the disclosure of which is incorporated herein by reference. As shown in FIG. 1, two KNN N-best lists 130-1 and 130-X are shown. Although only two KNN are shown in FIG. 1, the present invention is not limited to two neighbors and more or less neighbors may be used. Generally, the result 195 will be a single, selected word. However, an N-best list may be output as the recognition result 195 and can be added to the existing KNN classifier 120 database if desired.

In practice, a system 100 would generally start with an empty KNN classifier 120, which would be populated only as new handwritten words were processed by the system. As the number of N-best lists in the KNN classifier 120 increases, the overall accuracy improves. Various criteria for including an N-best list in the KNN classifier 120 can be designed.

To determine KNNs 130-1 and 130-X, a correlation factor 190 is used in this example. A correlation factor 190 is a metric that determines the similarity between two N-best lists. There are a variety of different correlation factors that may be used. Many such factors are described in "Retrieving Handwritten Documents Using Multiple Document Recognizers and Techniques Allowing both Typed and Handwritten Queries," U.S. Provisional Numbered 60/327,604, filed Oct. 4, 2001, U.S. patent application Ser. No. 10/079,741, filed Feb. 19, 2002, assigned to the assignee of the present invention and incorporated by reference herein. Several particular correlation factors will be discussed herein, although any distance metric may be used.

The correlation factor 190, C(",",), between two N-best lists, $\vec{S_i}$, and $\vec{S_j}$, is illustratively defined as follows:

$$C(\vec{S_i}, \vec{S_j}) = \frac{2\vec{S_i} \cdot \vec{S_j}}{\vec{S_i} \cdot \vec{S_i} + \vec{S_j} \cdot \vec{S_j}} \quad (1)$$

Note that this particular correlation factor 190 is symmetric, $$C(\vec{S_i}, \vec{S_j}) = C(\vec{S_j}, \vec{S_i}), \quad (2)$$

and that it is maximized when the N-best lists are equal, $$C(\vec{S_i}, \vec{S_j}) = 1, \quad (3)$$

and since the N-best list scores are all assumed to be nonnegative (or can be made nonnegative), this exemplary correlation factor 190 is minimized (i.e., zero) when the N-best lists are orthogonal. As previously discussed, the correlation factor attempts to measure the similarity between two N-best lists. Since each N-best list represents a transcription by the base classifier 110 of a handwritten word, the correlation factor measures the similarity between handwritten words.

For this reason, the correlation factor 190 is used to find KNNs in the KNN classifier 120. Note, as described above, that other similarity or distance measures, such as the cosine of the angle between two N-best lists, can also be used.

For instance, any of the following metrics might be used:

$$C = \frac{2\vec{S_i} \cdot \vec{S_j}}{(\vec{S_i} \cdot \vec{S_i} + \vec{S_j} \cdot \vec{S_j})},$$

$$C = \vec{S_i} \cdot \vec{S_j},$$

$$C = \sum_{k=1}^{N} |S_{i_k} - S_{j_k}|,$$

where $S_{i_k}$ is an element of $\vec{S_i}$ and $S_{j_k}$ is an element of $\vec{S_j}$. Additionally, $\vec{S_i}$ may be normalized through $$\vec{S_i'} = \vec{S_i} / \sqrt{\vec{S_i} \cdot \vec{S_i}} \text{ or } \vec{S_i'} = \vec{S_i} / \sum_{k=1}^{N} |\vec{S_{i_k}} \cdot \vec{S_{i_k}}|,$$

and $\vec{S_j}$ may also be normalized through these formulas. Moreover, $\vec{S_i}$ and $\vec{S_j}$ may be transformed through a linear transformation such as $S_{i_a} = S_{i_a} X_a + Y_a$, for all a, where a is some index of the vectors $\vec{S_i}$, $\vec{X}$, $\vec{Y}$, or though a nonlinear transformation such as $$\vec{S_{i'}} = f(\vec{S_i}).$$

It is important to note that it is the similarity between N-best lists which enables the present invention to correct errors made by the base classifier 110. Suppose, for example, that the base classifier generates a recently transcribed N-best list 150 for which the highest scoring word is not the correct label for the handwritten word. A label is a possible text transcription of a handwritten word. If this recently transcribed N-best list 150 is similar to another N-best that has the correct label and that is contained in the KNN classifier 120, then the error can be corrected. Empirically, it has been found that the statistical properties of the N-best lists from a given classifier are sufficiently consistent that two instances of N-best lists of translations of the same handwritten word are more similar than are two instances of N-best lists of translations of different handwritten words. Furthermore, if relative word scores 178, word lengths 176, word ranks 177, and correlation factor scores 179 are also considered (as explained in more detail below), then it is possible to determine which N-best list (e.g., from N-best list 150 and its KNNs 130-1 and 130-X) is correctly labeled and which is incorrectly labeled, and thereby collect recognition errors. Correcting recognition errors is performed by decision module 170.

Since the N-best lists 150 and 130 represent all the information the decision module 170 has about any handwritten word, when designing a decision module, it is important to determine which features 175 of the N-best lists are the most useful for determining when a word in an N-best list is the correct word the following heuristic features 175 have been used because they were useful, but these features are only exemplary. Additional features 175 may lead to improved performance. The following are descriptions of features 175:

Word Ranks 177: Correspond to the position of a word in a score-sorted N-best list. The likelihood that a word is the correct word drops significantly with increasing word tank. As a result, the top first and second ranked words, denoted as $W_1$ 151 and $W_2$ 152, respectively, are considered for the correct word label for N-best list 150.

Word Scores 178: The elements of $\vec{S}$. The likelihood that a word is correct increases with its score. In practice, this feature may be split into four regions using an upper, middle, and lower score thresholds, $S_U$, $S_M$, and $S_L$, respectively. Word scores 178 are assembled from scores 156, 157, 136-1, and 136-X.

Word Lengths 176: The number of characters in a word. The likelihood of a word being a correct translation of a handwritten word varies with word length. In practice, this feature may be split into two regions using a critical length threshold, $L_C$. The word lengths 176 are determined from words 151, 152, 131-1, and 131-X.

Correlation Factor Scores 179: These are the scores, using the correlation factor 190 that has been previously discussed, for the N-best list 150 and its two KNN N-best lists 130-1 and 130-X. The likelihood that two words have the same label increases with the correlation factor. Using two KNNs is exemplary, and more or less neighbors may be used. However, in practice, it has been found that approximately 95 percent of the correlation factor matches occurred in the two KNNs. Therefore for simplicity, the word labels, $R_1$ 131-1 and $R_2$ 131-X, of the closest two neighbors 130-1 and 130-X, respectively, are considered. In addition, this feature may be split into four regions using an upper, middle and lower correlation thresholds, $f_U$, $f_M$ and $f_L$, respectively.

The decision module 170 is essentially a mechanism for combining the base classifier 110 with the KNN classifier 120. It should be noted that much research has been done in the area of combining classifiers. It is recommended that the KNN classifier 120 not be used by itself to select the KNN word label as the correct answer. This recommendation is made because, at least initially and perhaps even for very large sets of N-best lists, the correct handwritten word may not correspond to any of the N-best lists 130 in the KNN classifier 120. If the correct word is not in the KNN classifier 120, then the KNN classifier 120 cannot correctly recognize the data and one should rely on the output of the base classifier 110 Therefore, the decision module 170 has been developed to determine when to rely on the KNN from the KNN classifier 120 and when to rely on the recently transcribed N-best list 150 from the base classifier 110.

Decision module 170 preferably employs machine learning techniques to provide combination rules 180 in order to improve the recognition of a handwritten word by determining an appropriate result 195 from recently transcribed N-best list 150 and KNN classifier 120. The machine learning techniques employed by decision module 170 may be any machine learning technique known to those skilled in the art, such as HMMs or NNs. Additionally, the particular structure shown in FIG. 1 for decision module 170 is only exemplary and other structures may be used.

Decision tree 185 is part of combination rules 180. Combination rules 180 are rules used to combine the output of the base classifier 110 with the output of the KNN classifier 120. The rule or rules in combination rules 180 are used to select a text word from text word choices in recently transcribed N-best list 150 and its KNN N-best lists 130-1 and 130-X. The rules use the features 175 of N-best lists, and the rules can be modified over time. For instance, decision module 170 could start with an empty set of rules in combination rules 180 and modify the features $W_1$, $W_2$, $S_U$, $S_M$, $S_L$, $L_C$, $f_U$, $f_M$, $f_L$, $R_1$, and $R_2$ appropriately as new N-best lists are added to or subtracted from KNN classifier 120. One way to implement a set of rules, which select a text word from N-best lists 150, 130-1, and 130-X, is to use a decision tree 185.

For expedience, a simple, lopsided decision tree 185 is used. An exemplary decision tree 185 is shown in FIG. 2. Decision tree 185 uses the features $W_1$, $W_2$, $S_U$, $S_M$, $S_L$, $L_C$, $f_U$, $f_M$, $f_L$, $R_1$, and $R_2$ and sets k=2 (i.e. the number of KNN N-best lists examined). Decision tree 185 results after a number of training handwritten words have been examined by handwriting recognition system 100 of FIG. 1. Those skilled in the art will recognize that more sophisticated methods could be used instead of decision tree 185. While decision tree 185 may not be optimal, experiments have shown that the use of a decision tree, such as decision tree 185, reduces the relative word error rate at least 10 percent, with an average reduction of 30 percent.

Thus, FIGS. 1 and 2 show a system 100 that uses the statistical patterns of a base classifier 110 to correct handwriting translation error. The decision module 170 and KNN classifier 120 may be added to currently existing handwriting recognition systems to improve recognition accuracy.

Figure 3:
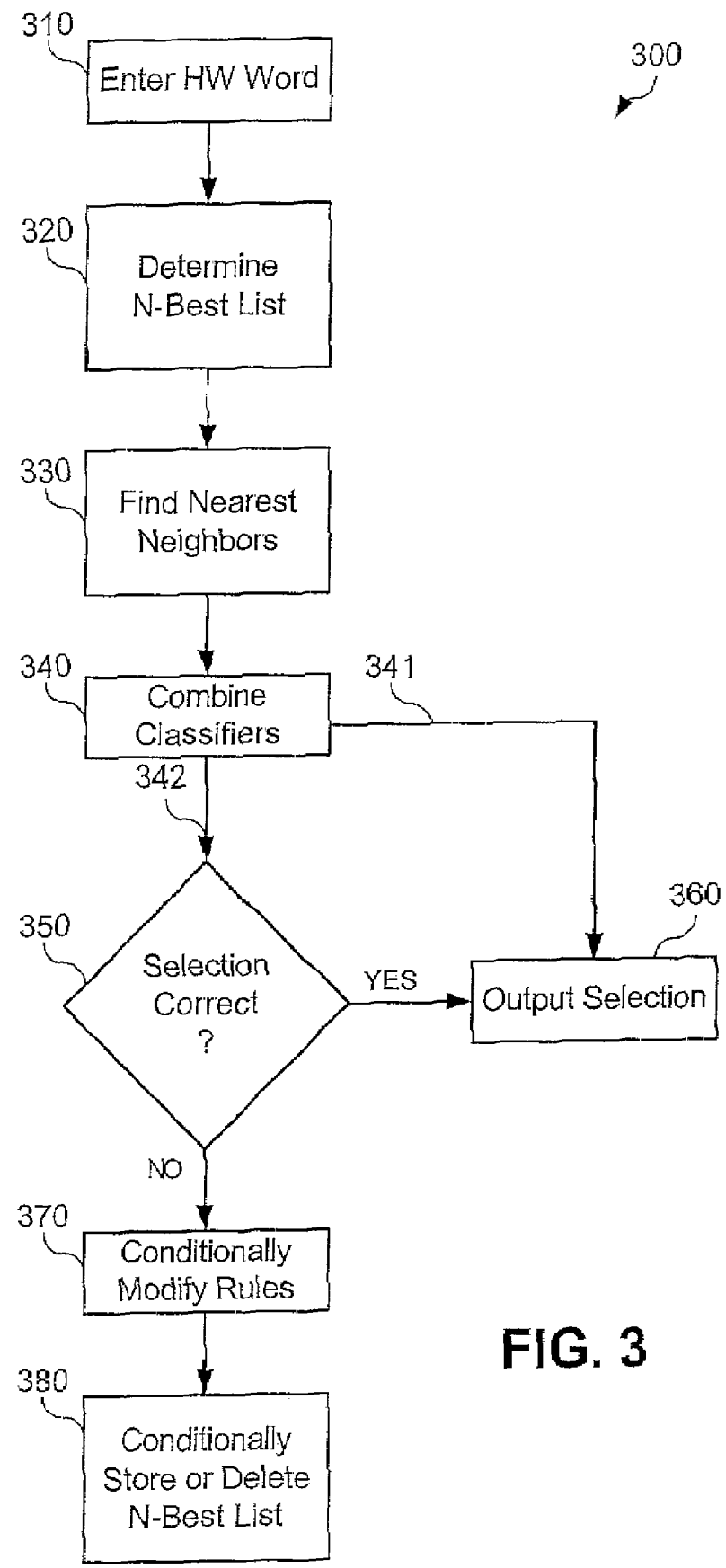
FIG. 3 is a method for handwritten word recognition using nearest neighbor techniques that allow adaptive learning, in accordance with one embodiment of the present invention.

Turning now to FIG. 3, a method 300 is shown for handwritten word recognition using KNN techniques that allow adaptive learning, in accordance with one embodiment of the present invention. Method 300 is used by a handwriting recognition system to improve handwritten recognition. For simplicity, method 300 deals with a single handwritten word.

Method 300 begins in step 310, when a handwritten word is entered. A handwritten word may be entered singly, such as when a person writes on a Personal Digital Assistant (PDA) In general, however, multiple handwritten words will be stored in a handwritten document, and the entire document will be processed at one time. In the latter situation, method 300 will iterate (not shown) through the handwritten document until all handwritten words have been transcribed. Method 300 will also generally iterate through many handwritten words during training, as is known in the art.

In step 320, an N-best list for the handwritten word is determined. Generally, a base classifier is used to determine the N-best list. Most handwriting recognition systems select the highest scoring word in the N-best list as the best choice of a translation of the handwritten word. However; method 300 applies more processing before determining whether the highest scoring word in the N-best list is the best choice of a translation of the handwritten word.

In step 330, the KNN N-best lists are found from a set of N-best lists that has been previously gathered Generally, this is performed by using a KNN classifier and a correlation function, as described above. A KNN classifier will usually start empty and then be filled through machine learning techniques. The N-best lists may be selected for placement into the KNN classifier by comparing the text words of the N-best list from a base classifier with the text words in the N-best lists (if any) in the KNN classifier and with a true text transcription of the handwritten word. These techniques are well known to those skilled in the art, and several references discussing such techniques have already been incorporated by reference above. In this manner, N-best lists axe added to the KNN classifier.

In step 340, the base and KNN classifiers are combined to select an appropriate result text word from the text words in the N-best lists from the base classifier and the KNN classifier. The base and KNN classifiers are combined through any technique known to those skilled in the art. In particular, combination rules may be developed in an adaptive manner, where the combination rules determine how to combine the two classifiers and which word should be selected.

During normal operation, path 341 would be chosen. With this path, the selected text word would be output in step 360. It is also possible to output the N-best list from which the text word was selected. Usually, however, only the selected text word is output. If path 341 is taken, the method 300 ends.

Steps 350 through 380 are used when training is performed. There are two types of training. In one type of training, the KNN classifier, such as KNN classifier 120 of FIG. 1, is trained; this is described in more detail below. In a second type of training, the decision module, such as decision module 170 of FIG. 1, is trained. Steps 350 through 380 are used to train the decision module.

One technique to perform learning is to use a training set, which contains, for each handwritten word, a correct transcription of the handwritten word. Thus, method 300 is able to compare its selection with a correct transcription. If the selection is correct (step 350=YES), the selected text word is output in step 360. If the selection is not correct (step 370=NO), the rules are modified (step 370) in order to make the system select the collect word. This is a machine learning step that is well known to those skilled in the art. By modifying the rules, the propel N-best list (which could be the determined N-best list from the base classifier), which contains the correct transcription of the handwritten word, will be chosen.

It should be noted that this modification of the rules is conditional. Depending on the machine learning technique used, the rules may not be modified in step 370. For example, a machine learning technique might determine that modifying the rules, while making this particular instance of handwritten word recognition more accurate, may make other instances of handwritten word recognition less accurate. In this situation, a modification to the rules would be detrimental Similarly, if the particular handwritten word has a low probability of occurrence, then the machine learning technique may determine that modification of the rules is not necessary.

Also in step 380, the N-best list determined during step 320 is added to the KNN classifier. This step is also conditional. In some systems, the repetition of N-best lists in the KNN classifier is undesirable. In these systems, the N-best list will not be added to the KNN classifier In other systems, it is beneficial, from a statistical standpoint, to have multiple similar or exact N-best lists. In these systems, the N-best list may be added to the KNN classifier even if it is similar to or exactly the same as an N-best list that already exists in the KNN classifier.

If the result is output as an N-best list instead of as a single text word, then additional considerations are possible. If the resultant N-best list is deemed trustworthy, then the resultant N-best list is added to the KNN classifier. If the resultant N-best list is deemed to be untrustworthy, then the determined N-best list may be a better choice for addition into the KNN classifier, based on certain criteria. For example, if the match between the determined N-best list and the resultant N-best list is poor, the determined N-best list might not be added to the KNN classifier. If the scores of the words in the determined N-best list are higher (to a predetermined degree) than the scores in the resultant N-best list, then the determined N-best list is added to the KNN classifier. There are many different criteria that may be used to determine when a determined N-best list (or a resultant N-best list) should be added to a KNN classifier.

In step 380, N-best lists may be deleted or replaced. For instance, N-best lists that are a certain age might be overwritten or removed. Thus, an N-best list that has been in the KNN classifier for over a year can be overwritten by the new N-best list or removed. Additionally, if there is an N-best list in the KNN classifier that disagrees with the rule just created, then this N-best list may be removed from the KNN classifier. Furthermore, confidence levels may be stored with or determined for each N-best list in a KNN classifier; and those N-best lists beneath a certain confidence may be removed.

For training of the KNN classifier, the resultant text word or N-best list (such as result 195 of FIG. 1) is not necessary, although it may be used. Training of the KNN classifier is performed to add or remove N-best lists to the KNN classifier. These training methods are well known to those skilled in the art.

It should be noted that learning steps 350 through 380 may also be performed when a user indicates that a transcription is wrong. For example, when a user indicates that a word is incorrectly transcribed, method 300 may execute steps 350 through 380 to update its combination rules and KNN classifier.

Many variations of the method 300 presented herein are possible. For example, it is possible that method 300 will slow linearly with the number of N-best lists in the KNN classifier. To ameliorate this problem, a method for pruning KNN classifier entries could be devised based on the age, accuracy, usefulness, or redundancy of an entry. However, this has not been a problem in experiments, as no significant slowdown in run-time was observed. Another variation to the method 300 proposed here would be to generalize the approach to k-nearest neighbors from the two KNNs used by the decision module. And yet another generalization would be to match substrings instead of words and thereby enable the construction of words which do not explicitly exist in the N-best list database. Substring or even character matching can be enabled using the Viterbi alignment from the Hidden Markov Model (HMM), used in the base classifier, to identify N-best lists for individual characters or character sets. Subsequent correlation calculations would proceed as before. It is important to note that method 300 relies on word repetition to improve recognition since a single KNN classifier can correctly override the base classifier only if the base classifier has previously correctly recognized the handwritten word. Thus if a writer consistently writes a word illegibly, this method 300 may never learn to recognize it. Substring methods may enable the method 300 to resolve this problem.

Figure 4:
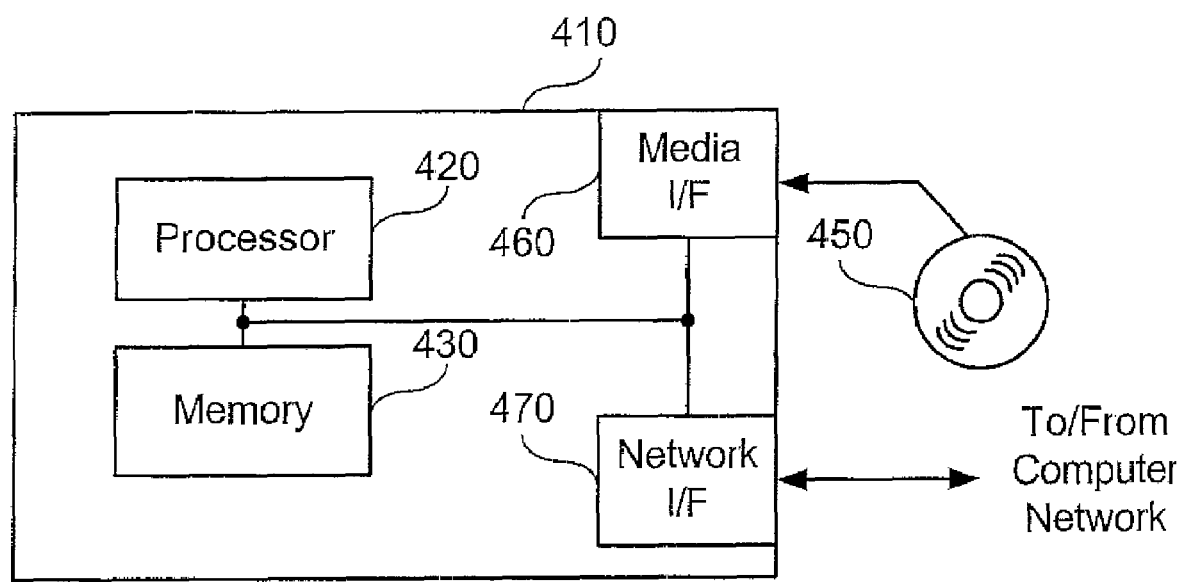
FIG. 4 is a block diagram of a system for handwritten word recognition using a neatest neighbor technique that allows adaptive learning, in accordance with one embodiment of the present invention.

Turning now to FIG. 4, a block diagram is shown of a system 410 for handwritten word recognition using KNN techniques that allow adaptive learning, in accordance with one embodiment of the present invention. System 410 is shown interacting with a Compact Disk (CD) 450 and a computer network Computer system 410 comprises a processor 420, a memory 430, a media interface 460 and a network interface 470.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 410, to carry out all or some of the steps to perform the methods or create the apparatuses discussed herein. The computer-readable medium may be a recordable medium (e.g., floppy disks, hard drives, compact disk 450, or memory cards) or may be a transmission medium (e.g., a network accessed through network interface 470, the network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to lead instructions and data, such as magnetic variations on a magnetic medium or height variations on the surface of a compact disk, such as compact disk 450, which is access through media interface 460.

Memory 430 configures the processor 420 to implement the methods, steps, and functions disclosed herein. The memory 430 could be distributed or local and the processor 420 could be distributed or singular. The memory 430 could be implemented as an electrical, magnetic or optical memory, or any combination of these or other types of storage devices. Moreover: the term "memory" should be construed broadly enough to encompass any information able to be read from or written to an address in the addressable space accessed by processor 410. With this definition, information on a network is still within memory 430 because the processor 420 can retrieve the information from the network. It should be noted that each distributed processor that makes up processor 420 generally contains its own addressable memory space. It should also be noted that some or all of computer system 410 can be incorporated into an application-specific or general-use integrated circuit.

It is to be understood that the embodiments and variations shown and described herein are merely illustrative of the principles of this invention and that various modifications may be implemented by those skilled in the art without departing from the scope and spirit of the invention.

What is claimed is:

1. A method comprising the steps of:
    determining a first list of possible word transcriptions of a first instance of a handwritten word;
    determining, from a plurality of additional lists of possible word transcriptions of one or more other instances of handwritten words, at least one second list; and
    determining which word from the first list or at least one second list should be selected as a best text word transcription of the handwritten word, wherein one or more of said steps are performed by a processor.

2. The method of claim 1, wherein the best text word transcription of the handwritten word is an incorrect transcription of the handwritten word.

3. The method of claim 1, wherein the best text word transcription of the handwritten word is a correct transcription of the handwritten word.

4. The method of claim 1, wherein the step of determining at least one second list comprises the step of determining a metric between the first list and each of the additional lists.

5. The method of claim 4, wherein the first and each additional list comprise a plurality of scores, wherein the metric comprises a correlation factor.

6. The method of claim 1, wherein the step of determining which word from the first list or at least one second list should be selected as a best text word transcription of the handwritten word comprises the steps of
    providing a feature of the first and additional lists; and
    using the feature to select a best text word from the first and at least one additional lists.

7. The method of claim 6, wherein the step of using the feature to select a best text word from the first and at least one additional lists further comprising the step of selecting the best text word according to at least one combination rule, the at least one combination rule using each of the at least one features.

8. The method of claim 7, wherein the at least one combination rule further comprises a decision tree of rules.

9. A method comprising the steps of:
    using a base classifier to determine a first list comprising a plurality of text words, each text word being a possible transcription of a handwritten word; and
    combining the base classifier with a nearest neighbor classifier to determine a resultant text word, the nearest neighbor classifier comprising a plurality of additional lists, each list comprising a plurality of words, wherein one or more of said steps are performed by a processor.

10. A method comprising the steps of:
    using a base classifier to determine a first list comprising a plurality of text words, each text word being a possible transcription of a handwritten word;
    determining a plurality of lists in a nearest neighbor classifier, each of the lists comprising a plurality of text words;
    providing a plurality of features of a list;
    selecting at least one nearest neighbor list, from the nearest neighbor classifier, by determining correlations between the first list and the lists in the nearest neighbor classifier; and
    determining, by using the features, which text word of the first and at least one nearest neighbor list should be selected as a best choice of a translation of the handwritten word, wherein one or more of said steps are performed by a processor.

11. A computer system comprising:
    a memory that stores computer-readable code; and
    a processor operatively coupled to the memory, the processor configured to implement the computer-readable code, the computer-readable code configured to:
    use a base classifier to determine a first list comprising a plurality of text words, each text word being a possible transcription of a handwritten word;
    determine a plurality of lists in a nearest neighbor classifier, each of the lists comprising a plurality of text words;
    provide a plurality of features of a list;
    select at least one nearest neighbor list, from the nearest neighbor classifier, by determining correlations between the first list and the lists in the nearest neighbor classifier; and
    determine, by using the features, which text word of the first and at least one nearest neighbor list should be selected as a best choice of a translation of the handwritten word.

12. An article of manufacture comprising:
    a computer readable medium having computer-readable code means embodied thereon, the computer-readable program code means comprising:
    a step to use a base classifier to determine a first list comprising a plurality of text words, each text word being a possible transcription of a handwritten word;
    a step to determine a plurality of lists in a nearest neighbor classifier, each of the lists comprising a plurality of text words;
    a step to provide a plurality of features of a list;
    a step to select at least one nearest neighbor list, from the nearest neighbor classifier, by determining correlations between the first list and the lists in the nearest neighbor classifier; and
    a step to determine, by using the features, which text word of the first and at least one nearest neighbor list should be selected as a best choice of a translation of the handwritten word.

* * * * *